(12) United States Patent
Atsuta

(10) Patent No.: US 12,138,837 B2
(45) Date of Patent: Nov. 12, 2024

(54) INJECTION MOLDING MACHINE MANAGEMENT SYSTEM

(71) Applicant: SEIKO EPSON CORPORATION, Tokyo (JP)

(72) Inventor: Kosuke Atsuta, Nagano (JP)

(73) Assignee: Seiko Epson Corporation, Tokyo (JP)

(*) Notice: Subject to any disclaimer, the term of this patent is extended or adjusted under 35 U.S.C. 154(b) by 29 days.

(21) Appl. No.: 18/061,492

(22) Filed: Dec. 5, 2022

(65) Prior Publication Data

US 2023/0173726 A1 Jun. 8, 2023

(30) Foreign Application Priority Data

Dec. 7, 2021 (JP) ................... 2021-198192

(51) Int. Cl.
 *B29C 45/76* (2006.01)
 *B29C 45/17* (2006.01)

(52) U.S. Cl.
 CPC .......... *B29C 45/76* (2013.01); *B29C 45/1774* (2013.01); *B29C 2045/7606* (2013.01); *B29C 2945/76107* (2013.01); *B29C 2945/7618* (2013.01)

(58) Field of Classification Search
 CPC .......................... B29C 45/76; B29C 45/1774
 See application file for complete search history.

(56) References Cited

U.S. PATENT DOCUMENTS

| | | | | |
|---|---|---|---|---|
| 2008/0078827 A1* | 4/2008 | Geiss | ...................... | B29C 49/78 235/375 |
| 2018/0178431 A1* | 6/2018 | Delaunay | ................ | B29C 45/80 |

FOREIGN PATENT DOCUMENTS

| | | | | |
|---|---|---|---|---|
| CN | 106863698 A | * | 6/2017 | ......... B29C 45/1769 |
| EP | 1457301 B1 | * | 11/2007 | ....... B29C 45/14811 |
| JP | 04175132 A | * | 6/1992 | ............. B29C 45/76 |
| KR | 20210004363 A | * | 1/2021 | ......... B29C 45/1774 |

OTHER PUBLICATIONS

Machine translation JPH04175132A (Year: 1992).*
Machine translation KR20210004363A (Year: 2021).*
Machine translation EP1457301A1 (Year: 2004).*
Machine translation CN106863698A (Year: 2017).*

* cited by examiner

*Primary Examiner* — Jacob T Minskey
*Assistant Examiner* — Wayne K. Swier
(74) *Attorney, Agent, or Firm* — Global IP Counselors, LLP

(57) ABSTRACT

Provided is an injection molding machine management system that includes an injection molding machine and manages one or a plurality of injection molding units that produce a molded article. The injection molding machine management system includes a display unit configured to display a display screen on which operation information on an operation status of the injection molding unit and at least one of container shortage information on a shortage of a container that accommodates the molded article and material shortage information on a shortage of a material for molding the molded article are displayed on an injection molding unit basis. The container shortage information is displayed on the display screen in association with the operation information when the container is insufficient in the injection molding unit, and the material shortage information is displayed on the display screen in association with the operation information when the material is insufficient in the injection molding unit.

6 Claims, 4 Drawing Sheets

| | MARK | COLOR OF ICON | OPERATION STATUS OF INJECTION MOLDING UNIT |
|---|---|---|---|
| Mk1 | ✕ | RED | STOPPED |
| Mk2 | ▶ | BLUE | OPERATING |
| Mk3 | ❚❚ | GRAY | PAUSED |
| Mk4 | ⊘ | YELLOW | POWER-OFF |

FIG. 5

| LINE | OPERATING RATE | DEFECTIVE RATE | UNIT | | | |
|---|---|---|---|---|---|---|
| L1 | 85 % | 970 ppm | 0 CONTAINER LEFT U1 | ✗ | 10 CONTAINERS LEFT U2 | ▶ |
| L2 | 97 % | 1200 ppm | MATERIAL REPLENISHMENT U3 | ✗ | MATERIAL REPLENISHMENT U4 | ▶ |
| L3 | 80 % | 0 ppm | U5 | ⦸ | | |
| L4 | 0 % | 0 ppm | U6 | ⏸ | U7 | ⏸ |

SC3

INJECTION MOLDING MACHINE MANAGEMENT SYSTEM

The present application is based on, and claims priority from JP Application Serial Number 2021-198192, filed Dec. 7, 2021, the disclosure of which is hereby incorporated by reference herein in its entirety.

BACKGROUND

1. Technical Field

The present disclosure relates to an injection molding machine management system.

2. Related Art

JP-B-7-90582 discloses that, in a management system that manages an injection molding machine, an operation status of the injection molding machine is displayed on a display of a host computer in real time. As a specific example of the operation status, a "mold abnormality" is shown.

When an abnormality of a mold or an abnormality of the injection molding machine occurs, production of a molded article in the injection molding machine is usually temporarily stopped. On the other hand, the production of the molded article in the injection molding machine may also be stopped due to a factor different from the abnormality, such as the material shortage. When a state in which the production of the molded article is stopped due to the factor different from such an abnormality is unnoticed, there is a possibility that a delay occurs in the production of the molded article even if no abnormality occurs in the injection molding machine or the mold.

SUMMARY

According to an aspect of the present disclosure, an injection molding machine management system that includes an injection molding machine and manages one or a plurality of injection molding units that produce a molded article is provided. The injection molding machine management system includes a display unit configured to display a display screen on which operation information on an operation status of the injection molding unit and at least one of container shortage information on a shortage of a container that accommodates the molded article and material shortage information on a shortage of a material for molding the molded article are displayed on an injection molding unit basis. The container shortage information is displayed on the display screen in association with the operation information when the container is insufficient in the injection molding unit, and the material shortage information is displayed on the display screen in association with the operation information when the material is insufficient in the injection molding unit.

BRIEF DESCRIPTION OF THE DRAWINGS

FIG. 2 is an explanatory diagram showing an example of a display screen according to a first embodiment.

FIG. 3 is a diagram showing an operation status represented by various marks and various colors of icons.

FIG. 5 is an explanatory diagram showing an example of a display screen according to a third embodiment.

DESCRIPTION OF EXEMPLARY EMBODIMENTS

A. First Embodiment

Figure 1:
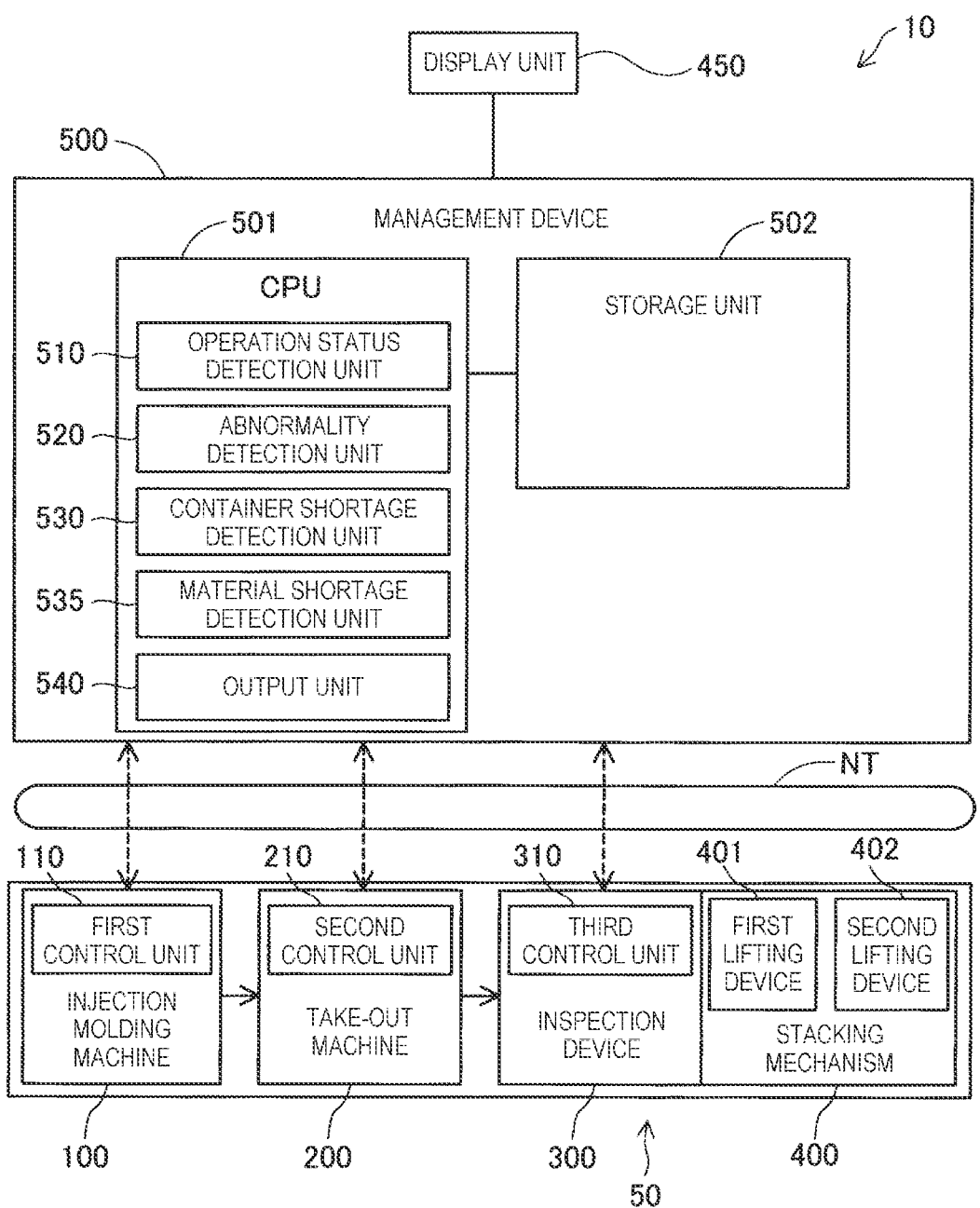
FIG. 1 is an explanatory diagram showing a schematic configuration of an injection molding machine management system.

FIG. 1 is an explanatory diagram showing a schematic configuration of an injection molding machine management system 10 according to a first embodiment. The injection molding machine management system 10 manages one or more injection molding units 50. The injection molding machine management system 10 according to the present embodiment includes a display unit 450 and a management device 500.

The injection molding unit 50 is a unit including an injection molding machine 100 that molds a molded article. In the present embodiment, as will be described later, a total of seven injection molding units 50 are managed by the injection molding machine management system 10, and in FIG. 1, one injection molding unit 50 is shown. The injection molding units 50 according to the present embodiment have the same configuration, and each include a take-out machine 200 and an inspection device 300 in addition to the injection molding machine 100 described above.

In FIG. 1, a flow of the molded article produced by the injection molding unit 50 is indicated by solid line arrows. In the injection molding unit 50, the molded article is molded by the injection molding machine 100, taken out from the injection molding machine 100 by the take-out machine 200 and conveyed to the inspection device 300, and inspected by the inspection device 300.

The injection molding machine 100 includes a first control unit 110, an injection device (not shown), and a mold clamping device (not shown). A mold having a cavity is attached to the mold clamping device. The mold may be made of a metal, a ceramic, or a resin. The metal mold is referred to as a mold. The first control unit 110 is implemented by a computer including one or a plurality of processors, a storage device, and an input and output interface for inputting and outputting signals to and from an outside. The first control unit 110 may be implemented by a plurality of computers. A second control unit 210 of the take-out machine 200 and a third control unit 310 of the inspection device 300, which will be described later, have the same configuration as the first control unit 110.

The first control unit 110 controls the units of the injection molding machine 100 to perform injection molding and mold the molded article. More specifically, the first control unit 110 controls the mold clamping device to clamp the mold, and controls the injection device to plasticize a material and inject the plasticized material into the mold, thereby molding the molded article having a shape corresponding to a shape of the cavity provided in the mold.

The first control unit 110 transmits physical quantity information indicating a physical quantity related to the injection molding to the management device 500. The physical quantity information includes measurement values measured by various sensors provided in the injection molding machine 100 and various command values related to the injection molding. The command values are values set in the injection molding machine 100 such as an injection filling time, an injection pressure, and a set temperature, and the measurement values are values obtained by measuring these actual values by the sensors.

Examples of a material for molding the molded article in the injection molding machine 100 include a resin material such as ABS formed in a pellet shape. In the present embodiment, the material is stored in a material storage unit (not shown) provided in the injection molding machine 100, and is supplied from the material storage unit to the above-described injection device. The material storage unit is implemented by, for example, a hopper. The material storage unit is replenished with the material from the outside via, for example, a loader.

When a remaining amount of the material in the material storage unit is less than an amount of the material required to mold the molded article during the production of the molded article, the first control unit 110 stops the injection molding performed by the injection molding machine 100. Accordingly, the production of the molded article in the injection molding unit 50 is temporarily stopped. In this case, the injection molding is restarted after the material storage unit is replenished with the material, whereby the production of the molded article is restarted.

In the present embodiment, the remaining amount of the material stored in the material storage unit is detected based on a detection value of a weight sensor (not shown) provided in the material storage unit. The weight sensor detects a weight of the material stored in the material storage unit, and the detection value is transmitted to the first control unit 110. In another embodiment, the first control unit 110 may detect the remaining amount of the material by measuring a height of the material stored in the material storage unit using, for example, a non-contact or contact ranging sensor.

The take-out machine 200 according to the present embodiment includes the second control unit 210, a take-out robot, and a cutting machine. The second control unit 210 controls operations of the take-out robot and the cutting machine. The take-out robot is, for example, a horizontal articulated robot or a vertical articulated robot. The take-out robot takes out the molded article from the mold of the injection molding machine 100. The cutting machine is a device that removes a sprue or a runner that is molded together with the molded article by the mold, from the molded article by cutting. In the present embodiment, the take-out robot grasps and takes out the molded article demolded from the mold by an ejector pin of the injection molding machine 100 by an end effector attached to a tip of an arm of the take-out robot. Thereafter, the sprue or the runner is removed from the molded article by the cutting machine, and the molded article from which the sprue or the runner is removed is conveyed to the inspection device 300 by the take-out robot. In another embodiment, the take-out robot may be, for example, a robot that holds the molded article by vacuum suction. The take-out machine 200 may not include the cutting machine.

The inspection device 300 according to the present embodiment includes the third control unit 310 and a camera. The third control unit 310 controls the camera to capture an image of the molded article, and analyzes the captured image of the molded article, thereby performing appearance inspection and dimension inspection of the molded article.

The third control unit 310 transmits inspection result data representing information on an inspection result of the molded article molded by the injection molding machine 100 to the management device 500. The inspection result data includes a dimension of the molded article, a quality determination result, and a type of defect that are measured using the camera.

In the present embodiment, the molded article subjected to the appearance inspection and the dimension inspection is accommodated in a container for accommodating the molded article by the robot constituting the take-out machine 200 described above. In the present embodiment, the container is a box-shaped tray having a plurality of recesses on a bottom surface thereof, and can accommodate a plurality of the molded articles. The molded article is accommodated in the tray while being positioned by the recess provided in the bottom surface of the tray. In another embodiment, the container may not have the recesses. The container may not have a box shape, and may have, for example, a flat plate shape capable of supporting the molded article. In addition, the container may accommodate only a single molded article instead of the plurality of molded articles.

In the present embodiment, the container is stored in a stacking mechanism 400 provided in the inspection device 300. The stacking mechanism 400 includes a first lifting device 401 that lifts and lowers accommodated containers in which the molded articles are accommodated while stacking the accommodated containers, and a second lifting device 402 that lifts and lowers empty containers in which the molded articles are not accommodated while stacking the empty containers. The above-described robot disposes a predetermined number of molded articles in the container disposed on the first lifting device 401. When the predetermined number of molded articles are disposed in the container, the first lifting device 401 lowers the container. A container disposed at an uppermost portion of the second lifting device 402 is slidably moved and disposed on the lowered container by a slide mechanism (not shown). Movement of the container from the first lifting device 401 to the second lifting device 402 may be performed by, for example, the robot. A plurality of the empty containers are stacked and stored on the second lifting device 402, and when the uppermost container moves onto the first lifting device 401, the second lifting device 402 lifts the remaining containers.

When the number of remaining empty container is insufficient during the production of the molded article, the production of the molded article in the injection molding unit 50 is temporarily stopped. More specifically, when the number of the accommodated containers stacked on the first lifting device 401 is equal to or greater than a predetermined number or when the number of the remaining empty containers stacked on the second lifting device 402 is 0, the second control unit 210 stops the robot transporting the molded article to the stacking mechanism 400, and the first control unit 110 stops the injection molding by the injection molding machine 100. Accordingly, the production of the molded article is temporarily stopped. In this case, after the accommodated containers are carried out of the stacking mechanism 400 or the empty containers are replenished to the stacking mechanism 400, the conveyance of the molded article to the stacking mechanism 400 by the robot and the injection molding are restarted, and thus the production of the molded article is restarted. Hereinafter, the number of the remaining amount empty containers is also simply referred to as "the number of the remaining containers".

In the present embodiment, the number of the remaining empty containers is detected based on a detection value of a weight sensor (not shown) provided in the first lifting device 401 or the like. The weight sensor detects a weight of the empty containers stacked on the first lifting device 401, and the detection value is transmitted to the third control unit 310. Then, the third control unit 310 calculates the number of the empty containers as the number of the remaining empty containers based on the detection value of the sensor. The third control unit 310 transmits the calculated number of the empty containers to the first control unit 110 and the second control unit 210. In another embodiment, the third control unit 310 may measure a height of the containers stacked on the first lifting device 401 by, for example, a non-contact or contact ranging sensor, and detect the number of the remaining empty containers based on a measured height.

The injection molding unit 50 stops the production of the molded article not only when the above-described container or material is insufficient but also when an abnormality occurs in the injection molding unit 50. When the production of the molded article is continued with the abnormality of the injection molding unit 50 being unnoticed, for example, the units of the injection molding machine 100 or the mold may be damaged, or defective products that do not satisfy criteria regarding appearance, dimensional accuracy, and the like may be continuously produced. The abnormality of the injection molding unit 50 includes abnormalities of the units of the injection molding machine 100 such as an injection device and a mold clamping device, a mold attached to the injection molding machine 100, the take-out machine 200, the inspection device 300, and the like. In the injection molding unit 50, for example, the first control unit 110, the second control unit 210, and the third control unit 310 detect the abnormality based on the physical quantity information, inspection data, detection values of other various sensors, and the like. Further, when an emergency stop button (not shown) is pressed, the first control unit 110 and the like detect that the abnormality occurs in the injection molding unit 50.

The display unit 450 according to the present embodiment is implemented by a liquid crystal display provided in the management device 500. Various types of information output from the management device 500 are displayed on the display unit 450. The display unit 450 may have, for example, a touch panel function. In another embodiment, the display unit 450 may not be provided in the management device 500, and may be, for example, a display of a device such as a computer, a tablet terminal, or a smartphone separate from the management device 500.

The management device 500 is implemented by a computer including a CPU 501 and a storage unit 502. The storage unit 502 includes a main storage device and an auxiliary storage device.

The management device 500 can communicate with the injection molding units 50. More specifically, in the present embodiment, the management device 500 is communicably connected to the injection molding machine 100, the take-out machine 200, and the inspection device 300 included in each of the injection molding units 50. In the present embodiment, the management device 500 can communicate with the injection molding machine 100, the take-out machine 200, and the inspection device 300 via a network NT. The network NT may be, for example, an LAN, a WAN, or the Internet. The management device 500 communicates with the injection molding machine 100, the take-out machine 200, and the inspection device 300 via the network NT to transmit and receive data to and from the injection molding machine 100, the take-out machine 200, and the inspection device 300.

The management device 500 includes an operation status detection unit 510, an abnormality detection unit 520, a container shortage detection unit 530, a material shortage detection unit 535, and an output unit 540. The operation status detection unit 510, the abnormality detection unit 520, the container shortage detection unit 530, the material shortage detection unit 535, and the output unit 540 are implemented by the CPU 501 executing programs stored in the storage unit 502. The operation status detection unit 510, the abnormality detection unit 520, the container shortage detection unit 530, the material shortage detection unit 535, and the output unit 540 may be implemented by a circuit.

The operation status detection unit 510 detects an operation status of the injection molding unit 50 for each of the injection molding units 50. In the present embodiment, the operation status detection unit 510 detects, as the operation status, whether the injection molding unit 50 is in a stopped state, an operating state, a paused state, or a power-off state. The operation status detection unit 510 stores a detection result of the operation status into the storage unit 502.

The stopped state indicates that the production of the molded article in the injection molding unit 50 is temporarily stopped. In the present embodiment, in the injection molding unit 50, when the abnormality occurs in the injection molding unit 50 or when the material or the container is insufficient as described above, the injection molding unit 50 is in the stopped state. The operating state indicates that the injection molding unit 50 is operating and the molded article is being produced in the injection molding unit 50. Unlike the stopped state described above, the paused state indicates that the production of the molded article is not started in the injection molding unit 50. The injection molding unit 50 is paused, for example, during a period from an end of production of a certain lot to a start of production of a next lot, or during execution of periodic maintenance.

The operation status detection unit 510 may detect, for example, the operation status by acquiring the operation status from the injection molding unit 50. Further, the operation status detection unit 510 may detect the operation status of the injection molding unit 50 based on, for example, the physical quantity information and the inspection result data received from the injection molding unit 50.

The abnormality detection unit 520 detects the abnormality of the injection molding unit 50 for each of the injection molding units 50. The abnormality detection unit 520 detects the abnormality of the injection molding unit 50, for example, by receiving a signal indicating the abnormality from the injection molding unit 50. The abnormality detection unit 520 stores a detection result of the abnormality in the storage unit 502.

The container shortage detection unit 530 detects a shortage of the container that accommodates the molded article for each of the injection molding units 50. In the present embodiment, the container shortage detection unit 530 acquires information on the number of the remaining containers from the injection molding unit 50, and detects that the container is insufficient based on the acquired information on the number of the remaining containers. In the present embodiment, the container shortage detection unit 530 determines that the container is insufficient when the number of the remaining containers is equal to or less than a predetermined first amount. The first amount according to the present embodiment is represented by a value representing the number of the empty containers, and is determined as a value of 1 or more. The container shortage detection unit 530 stores a detection result of the shortage of the container into the storage unit 502. In another embodiment, the container shortage detection unit 530 may detect the shortage of the container, for example, by acquiring information indicating that the container is insufficient from the injection molding unit 50.

The material shortage detection unit 535 detects a shortage of the material for molding the molded article for each of the injection molding units 50. In the present embodiment, the material shortage detection unit 535 acquires information on the remaining amount of the material from the injection molding unit 50, and detects that the material is insufficient based on the acquired information on the remaining amount of the material. In the present embodiment, the material shortage detection unit 535 determines that the material is insufficient when the remaining amount of the material is equal to or less than a predetermined second amount. The second amount according to the present embodiment is represented by a weight, and is represented as a weight equal to or greater than a weight of the material required for molding one molded article. The material shortage detection unit 535 stores a detection result of the shortage of the material into the storage unit 502. In another embodiment, the material shortage detection unit 535 may detect the shortage of the material by acquiring information indicating that the material is insufficient from the injection molding unit 50.

The output unit 540 generates display data including data for drawing a display screen, which will be described later, based on the detection result of the operating state, the detection result of the shortage of the material, and the detection result of the shortage of the container. The output unit 540 displays the display screen on the display unit 450 based on the generated display data.

FIG. 2 is an explanatory diagram showing an example of a display screen SC displayed on the display unit 450 in the first embodiment. In the present embodiment, an operating rate, a defective rate, and states of the injection molding units 50 included in the manufacturing line are disposed side by side and collectively displayed for each manufacturing line on the display screen SC. As described above, these injection molding units 50 are managed by the injection molding machine management system 10.

As shown in FIG. 2, in the present embodiment, a total of seven injection molding units 50 are managed by the injection molding machine management system 10, and states thereof are displayed on the display screen SC. In the present embodiment, a first unit U1 and a second unit U2 are disposed in a first manufacturing line L1. A third unit U3 and a fourth unit U4 are disposed in a second manufacturing line L2. A fifth unit U5 is disposed in a third manufacturing line L3. A sixth unit U6 and a seventh unit U7 are disposed in a fourth manufacturing line L4. In another embodiment, the number of the injection molding units 50 managed by the injection molding machine management system 10 may be one, two to six, or eight or more.

On the display screen SC, for example, identification information on the first manufacturing line L1, an operating rate and a defective rate in the first manufacturing line L1, and states of the first unit U1 and the second unit U2 included in the first manufacturing line L1 are displayed side by side as information on the first manufacturing line L1. In the present embodiment, the identification information on the manufacturing line is represented by a character string including a manufacturing line number. For example, on the display screen SC shown in FIG. 2, a character string "L1" is displayed as the identification information on the first manufacturing line L1. The identification information on the manufacturing line may be input via, for example, an input unit provided in the management device 500, or may be acquired from the injection molding machine 100 or the like of the injection molding unit 50.

On the display screen SC, operation information on each of the injection molding units 50 and at least one of container shortage information and material shortage information on each of the injection molding units 50 are displayed as the state of each of the injection molding units 50. The operation information is information on the operation status of the injection molding unit 50, and is, for example, information indicating that the injection molding unit 50 is in the stopped state or in the operating state. The container shortage information is information on the shortage of the container. The material shortage information is information on the shortage of the material. On the display screen SC according to the present embodiment, the operation information and both the container shortage information and the material shortage information are displayed as the state of each of the injection molding units 50.

In the present embodiment, the operation information on each of the injection molding units 50 is represented by various marks disposed on substantially rectangular icons representing the injection molding units 50 and various colors of icons. In the present embodiment, in addition to the marks, the identification information on the injection molding unit 50 represented by the icon is displayed on the icon. In another embodiment, other information on the injection molding unit 50, such as a model number of the injection molding unit 50, may be displayed on the icon.

FIG. 3 is a diagram showing the operation status of the injection molding unit 50 represented by the various marks disposed on the icons and the various colors of icons in the present embodiment. As shown in FIG. 3, in the present embodiment, when a first mark Mk1 is displayed on the icon and the color of icon representing the injection molding unit 50 is red, the injection molding unit 50 is stopped. For example, the display screen SC of FIG. 2 shows that the first unit U1 is currently stopped. When a second mark Mk2 is displayed on the icon and the color of icon is blue, the injection molding unit 50 is in the operating state. When a third mark Mk3 is displayed on the icon and the color of icon is gray, the injection molding unit 50 is paused. When a fourth mark Mk4 is displayed on the icon and the color of icon is yellow, the injection molding unit 50 is turned off. In the present embodiment, the first mark Mk1 to the fourth mark Mk4 are represented by figures. In this way, since the operation status of the injection molding unit 50 is represented by the figure and the color, visibility of the operation status on the display screen SC can be enhanced.

When the operation status is displayed by the icon and the mark, the color of icon, a shape of the mark, and the like may not be the form shown in FIG. 3. For example, the shape of the icon may not be a substantially rectangular shape, and may be, for example, a circular shape, an elliptical shape, or a substantially polygonal shape other than a rectangular shape. The operation status displayed on the display screen SC as the operation information may not include all of the stopped state, the operating state, the paused state, and the power-off state described above. For example, only information indicating the stopped state and information indicating the operating state may be displayed on the display screen SC as the operation information. Information indicating a state other than the above-described states may be displayed on the display screen SC as the operation information. In addition, for example, the mark may not be displayed on the icon in a case of indicating the operating state, and a mark may be displayed in a case of indicating another operation status, whereby the operating state and the other states may be distinguished and displayed on the display screen SC. Similarly, the mark may not be displayed on the icon in a case of indicating the stopped state, whereby the stopped state and the other states may be distinguished and displayed on the display screen SC.

In the present embodiment, the container shortage information is displayed on the display unit 450 in association with the operation information when the container is insufficient in the injection molding unit 50. For example, in the example of FIG. 2, the display screen SC shows that the first unit U1 is in the stopped state indicated by the red color of the icon representing the first unit U1 and the first mark Mk1, and the container shortage information on the first unit U1 is displayed on the icon representing the first unit U1. More specifically, as the container shortage information, a character string of "container replacement" and a fifth mark in which a symbol representing an alphabet "i" is disposed inside a circle are displayed in a region different from a region in which the first mark Mk1 is displayed on the icon representing the first unit U1. That is, in a state in which the display screen SC shown in FIG. 2 is displayed, the first unit U1 is in the stopped state and the container is insufficient. In the present embodiment, in this case, the management device 500 determines that the first unit U1 is stopped due to the shortage of the container.

In addition, in the example of FIG. 2, the display screen SC shows that the second unit U2 is in the operating state, and the container shortage information on the second unit U2 is displayed. That is, in the state in which the display screen SC of FIG. 2 is displayed, the second unit U2 continues to produce the molded article, and the number of the remaining containers in the second unit U2 is equal to or less than the first amount described above. As described above, since the first amount according to the present embodiment is determined as a value equal to or greater than 1 representing the number, the container shortage information is displayed on the display screen SC before the injection molding unit 50 stops the production of the molded article due to the shortage of the container. From this state, when the second unit U2 is not replenished with the containers and the operation of the second unit U2 is continued, the number of the remaining containers in the second unit U2 eventually becomes 0. In this case, the production of the molded article in the second unit U2 is stopped, and information indicating that the second unit U2 is in the stopped state is displayed on the display screen SC. In the present embodiment, during this time, a character string of "container shortage" described above is maintained as being displayed on the display screen SC as the container shortage information.

The first amount described above is preferably determined as an amount at which the stop of the injection molding unit 50 due to the shortage of the container can be prevented and the number of times of replenishment of the container can be reduced. In this case, the first amount is determined, for example, based on a time required for a user to replenish the injection molding unit 50 in which the container is insufficient with the container after checking the container shortage information displayed on the display unit 450.

In the present embodiment, when the material is insufficient in the injection molding unit 50, the material shortage information is displayed on the display unit 450 in association with the operation information. For example, in the example of FIG. 2, the display screen SC shows that the third unit U3 is in the stopped state, and the material shortage information on the third unit U3 is displayed. More specifically, a character string of "material replenishment" and the fifth mark are displayed as the material shortage information in a region different from the region in which the first mark Mk1 is displayed on the icon representing the third unit U3. That is, in the state in which the display screen SC shown in FIG. 2 is displayed, the third unit U3 is in the stopped state and the material is insufficient. In the present embodiment, in this case, the management device 500 determines that the third unit U3 is stopped due to the shortage of the material.

In addition, in the example of FIG. 2, the display screen SC shows that the fourth unit U4 is in the operating state, and the material shortage information on the fourth unit U4 is displayed. That is, in the state in which the display screen SC of FIG. 2 is displayed, the fourth unit U4 continues to produce the molded article, and the number of the remaining containers in the fourth unit U4 is equal to or less than the second amount described above. As described above, since the second amount according to the present embodiment is determined as the weight equal to or greater than the weight of the material required to mold one molded article, the material shortage information is displayed on the display screen SC before the injection molding unit 50 stops the production of the molded article due to the shortage of the material. From this state, when the fourth unit U4 is not replenished with the material and the operation of the fourth unit U4 is continued, the remaining amount of the material in the fourth unit U4 eventually becomes less than an amount of the material required for molding one molded article. In this case, the production of the molded article in the fourth unit U4 is stopped, and information indicating that the fourth unit U4 is in the stopped state is displayed on the display screen SC. In the present embodiment, during this time, a character string of "material shortage" described above is maintained as being displayed on the display screen SC as the material shortage information.

The second amount described above is preferably determined as an amount at which the stop of the injection molding unit 50 due to the shortage of the material can be prevented and the number of times of replenishment of the material can be reduced. In this case, the second amount is determined, for example, based on a time required for the user to replenish the injection molding unit 50 in which the material is insufficient with the material after checking the material shortage information displayed on the display unit 450.

Although not shown in FIG. 2, in the present embodiment, when the container is insufficient and the material is insufficient in the certain injection molding unit 50, the container shortage information and the material shortage information on the injection molding unit 50 are displayed on the display screen SC. In this case, for example, the container shortage information and the material shortage information may be simultaneously displayed in different regions of the display screen SC, or may be alternately displayed in the same region of the display screen SC. In the present embodiment, the display screen SC may show that the certain injection molding unit 50 is in the stopped state, and neither the container shortage information nor the material shortage information of the injection molding unit 50 may be displayed. In this case, the injection molding unit 50 is stopped due to a cause different from both the shortage of the containers and the shortage of the material, such as the abnormality.

According to the first embodiment described above, the injection molding machine management system 10 includes the display unit 450 that displays the display screen SC on which the operation information and at least one of the container shortage information and the material shortage information are displayed for each of the injection molding units 50. The container shortage information is displayed on the display screen SC in association with the operation information when the container in the injection molding unit 50 is insufficient. The material shortage information is displayed on the display screen SC in association with the operation information when the material is insufficient in the injection molding unit 50. Accordingly, the user can replenish the container or the material based on the container shortage information or the material shortage information while referring to the operation information displayed on the display screen SC. Therefore, it is more possible to prevent a delay in the production of the molded article caused by a state in which the container or the material is insufficient in the injection molding unit 50 being unnoticed.

According to the present embodiment, the container shortage information is displayed on the display screen SC when the number of the remaining containers in the injection molding unit 50 is smaller than the first amount, and the material shortage information is displayed on the display screen SC when the remaining amount of the material in the injection molding unit 50 is smaller than the second amount. Therefore, the container shortage information or the material shortage information can be displayed on the display screen SC by simple control at a timing at which the remaining amount of the material or the number of the remaining containers becomes a desired amount.

Further, according to the present embodiment, the container shortage information is displayed on the display screen SC before the injection molding unit 50 stops the production of the molded article due to the shortage of the container, and the material shortage information is displayed on the display screen SC before the injection molding unit 50 stops the production of the molded article due to the shortage of the material. Accordingly, compared to a case in which the container shortage information or the material shortage information is displayed only when the injection molding unit 50 is stopped due to, for example, the container shortage or the material shortage, it is more possible to replenish the container and the material before the injection molding unit 50 is stopped or at a timing earlier than the stop of the injection molding unit 50. Therefore, it is more possible to prevent the delay in the production of the molded article.

B. Second Embodiment

Figure 4:
FIG. 4 is an explanatory diagram showing an example of a display screen according to a second embodiment.

FIG. 4 is an explanatory diagram showing an example of a display screen SC2 displayed on the display unit 450 in a second embodiment. Unlike the first embodiment, the display unit 450 according to the present embodiment displays, for each of the injection molding units 50, abnormality information on an abnormality of the injection molding unit 50 in addition to the container shortage information and the material shortage information. In configurations of the display screen SC2 and the injection molding machine management system 10 according to the present embodiment, portions not particularly described are the same as those in the first embodiment.

In the present embodiment, when the abnormality occurs in the injection molding unit 50, the abnormality information is displayed on the display screen SC2 in association with operation information. For example, in the example of FIG. 4, the display screen SC2 shows that the first unit U1 is in a stopped state, and abnormality information on the first unit U1 is displayed. More specifically, a character string of "abnormality" and a fifth mark are displayed as the abnormality information in a region different from a region in which the first mark Mk1 is displayed on an icon representing the first unit U1. That is, in a state in which the display screen SC shown in FIG. 4 is displayed, the first unit U1 is in the stopped state and the abnormality occurs. In the present embodiment, in this case, the management device 500 determines that the first unit U1 is stopped due to the abnormality.

In the present embodiment, when a shortage of container and the abnormality occur in the injection molding unit 50, the container shortage information and the abnormality information on the injection molding unit 50 are displayed in different regions of the display screen SC2. For example, in the example of FIG. 4, the abnormality information on the fourth unit U4 and the container shortage information on the fourth unit U4 described above are displayed side by side in a vertical direction on an icon representing the fourth unit U4. Even when a shortage of a material and the abnormality occur in the injection molding unit 50, the material shortage information and the abnormality information on the injection molding unit 50 are displayed in different regions of the display screen SC2 in the same manner as in the case described above.

According to the second embodiment described above, the display unit 450 displays the abnormality information for each of the injection molding units 50. When the abnormality occurs in the injection molding unit 50, the abnormality information is displayed on the display screen SC2 in association with the operation information. Accordingly, when the abnormality information is displayed on the display screen SC2, a user can eliminate the abnormality based on the displayed abnormality information, and when the container shortage information or the material shortage information is displayed, the user can replenish the container or the material based on the displayed information. In particular, for example, when a person in charge who eliminates the abnormality and a person in charge who replenish the container or the material are different from each other, it is possible to determine which person in charge copes with a situation based on the information displayed on the display unit 450. Therefore, it is more possible to quickly eliminate the abnormality, the shortage of the material, and the shortage of the container in the injection molding unit 50, and to prevent a delay in production of a molded article.

In addition, according to the present embodiment, when the shortage of the container and the abnormality occur in the injection molding unit 50, the container shortage information and the abnormality information are displayed in different regions of the display screen SC2, and when the shortage of the material and the abnormality occur, the material shortage information and the abnormality information are displayed in different regions of the display screen SC2. Accordingly, for example, compared to a case in which the container shortage information or the material shortage information and the abnormality information are alternately displayed in the same region of the display screen SC2, it is possible to improve visibility of the container shortage information or the material shortage information and the abnormality information on the display screen SC2. Therefore, for example, it is possible to prevent the injection molding unit 50 from being stopped again due to the shortage of the container or the shortage of the material immediately, as a result of overlooking the container shortage information or the material shortage information, after the processing of eliminating the abnormality in the injection molding unit 50 is completed and the production of the molded article is restarted. Therefore, it is more possible to prevent the delay in the production of the molded article.

C. Third Embodiment

FIG. 5 is an explanatory diagram showing an example of a display screen SC3 displayed on the display unit 450 in a third embodiment. In the present embodiment, unlike the first embodiment, container shortage information is represented by the number of containers. In configurations of the display screen SC3 and the injection molding machine management system 10 in the present embodiment, portions not particularly described are the same as those in the first embodiment.

In the present embodiment, the container shortage information is represented by the number of empty containers in the injection molding unit 50. More specifically, in the present embodiment, the container shortage information is represented by the current number of empty containers calculated based on a sensor that detects the number of remaining containers provided in the stacking mechanism 400. In the example of FIG. 5, the display screen SC3 shows that the first unit U1 is in a stopped state, and as the container shortage information on the first unit U1, a character string of "0 container left" including a numerical value "0" is displayed together with a fifth mark. In addition, the display screen SC3 shows that the second unit U2 is in an operating state, and as the container shortage information of the second unit U2, a character string of "10 containers left" including a numerical value "10" is displayed together with the fifth mark.

According to the third embodiment described above, the container shortage information is represented by the number of empty containers. Therefore, it is more possible to replenish containers at a more appropriate timing. In another embodiment, the container shortage information may be represented by, for example, the number of accommodated containers. Further, as the container shortage information, both the number of empty containers and the number of accommodated containers may be displayed on the display unit 450. With these forms, similarly to the third embodiment, it is more possible to replenish the containers at a more appropriate timing.

In another embodiment, for example, similarly to a case in which the container shortage information is represented by the number of containers in the third embodiment, material shortage information may be represented by the amount of materials. In addition, the container shortage information or the material shortage information may be displayed by an estimated time until the container or the material becomes insufficient, the number of molded articles that can be produced until the container or the material becomes insufficient, or the like.

D. Other Embodiments (D1) In the above embodiments, the display unit 450 displays both the container shortage information and the material shortage information, and may display only one of the container shortage information and the material shortage information. Therefore, for example, the injection molding unit 50 that does not use a container for transporting a molded article may be managed by the injection molding machine management system 10.

(D2) In the above embodiments, when a shortage of a container and an abnormality occur in the injection molding unit 50, the container shortage information and the abnormality information are displayed in different regions of the display screen SC2, and may be displayed in the same region. For example, the container shortage information and the abnormality information may be alternately displayed in the same region of the display screen SC2. Similarly, the material shortage information and the abnormality information may be displayed in the same region of the display screen SC2.

(D3) In the above embodiments, the container shortage information is displayed on the display screen SC when the number of the remaining containers is equal to or less than the first amount. Meanwhile, for example, the container shortage information may be displayed when the amount of the accommodated containers is equal to or greater than a predetermined amount. In addition, the container shortage information may be displayed when the number of molded articles that can be produced until the number of the remaining containers becomes 0, which is calculated based on the number of the empty containers or the number of the accommodated containers, becomes equal to or less than a predetermined number, or when the time during which the molded article can be produced until the number of the remaining containers becomes 0 is equal to or less than a predetermined time. Similarly, the material shortage information may not be displayed on the display screen SC when the remaining amount of the material is equal to or less than the second amount.

(D4) In the above embodiments, the container shortage information is displayed on the display screen SC before the production of the molded article is stopped due to the shortage of the container in the injection molding unit 50. On the other hand, the container shortage information may be displayed, for example, only when the production of the molded article is stopped due to the shortage of the container in the injection molding unit 50. Similarly, the material shortage information may be displayed, for example, only when the production of the molded article is stopped due to the shortage of the material in the injection molding unit 50.

(D5) In the above embodiments, various kinds of information such as the operating rate are collectively displayed for each manufacturing line on the display screen SC. On the other hand, on the display screen SC, various kinds of information may not be displayed for each manufacturing line, and for example, may be simply displayed for each injection molding unit 50, or may be displayed for each factory.

(D6) In the above embodiments, the operation status of the injection molding unit 50 is represented by the mark and the color of icon. On the other hand, the operation status may be represented by only the mark or only the color of icon. The operation status may be represented by, for example, a character string or a shape of icon instead of the mark and the color of icon. In addition, the operation status may not be displayed on the icon, and for example, may be displayed only by the character string or the mark.

(D7) In the above embodiments, the container shortage information is represented by the fifth mark and the character string of "container replacement". The container shortage information may be represented by a mark other than the fifth mark, a character string other than "container replacement", or the like. In addition, for example, the container shortage information may be displayed by a change in a color of the character string or the mark. In this case, for example, the container shortage information may be displayed by displaying the character string such as "container replacement" in white when the container is not insufficient in the injection molding unit 50 and displaying the character string in red when the container is insufficient. Similarly, for example, the container shortage information may be displayed by displaying the mark such as the fifth mark in white when the container is not insufficient and displaying the mark in red when the container is insufficient. In addition, when the container is insufficient, one or both of the mark and the character string may be blinked. Further, the container shortage information may be displayed by displaying marks having different shapes between a case in which the container is not insufficient and a case in which the container is insufficient. Similarly, the material shortage information may be represented by a mark other than the fifth mark, a character string other than "material replenishment", or the like, and the abnormality information may be represented by a mark other than the fifth mark, a character string other than "abnormality", or the like. When the operation status is not represented by the color of icon, for example, the container shortage information or the material shortage information and the abnormality information may be represented by the color of icon.

(D8) In the above embodiments, in the injection molding unit 50, when the material or the container is insufficient, the control unit provided in the injection molding unit 50, such as the first control unit 110, stops the injection molding, and thus the production of the molded article is stopped. In contrast, when the material or the container is insufficient, for example, the injection molding may be stopped by an operation of the user, and thus the production of the molded article in the injection molding unit 50 may be stopped.

(D9) In the above embodiments, when the container is insufficient in the injection molding unit 50, the injection molding by the injection molding machine 100 is stopped in addition to the conveyance of the molded article to the stacking mechanism 400 by the robot. In contrast, when the container is insufficient, the injection molding may not be immediately stopped. For example, when a molded article obtained by the injection molding is transported by a robot after being transported to a temporary storage place by a belt conveyor or the like, the injection molding may be continued while the molded article can be received in the temporary storage place. In this case, the production of the molded article in the injection molding unit 50 is stopped, and the injection molding is continued.

(D10) In the above embodiments, the injection molding unit 50 includes the injection molding machine 100, the take-out machine 200, and the inspection device 300. On the other hand, the injection molding unit 50 may include only the injection molding machine 100. The take-out machine 200 and the inspection device 300 may not be provided. In the above embodiments, the injection molding units 50 managed by the injection molding machine management system 10 are the same as one another. However, the configurations of the injection molding units 50 may be different from one another. For example, both the injection molding unit including only the injection molding machine 100 and the injection molding unit 50 including the injection molding machine 100, the take-out machine 200, and the inspection device 300 as in the above-described embodiments may be managed by the injection molding machine management system 10.

E. Other Embodiments

The present disclosure is not limited to the embodiments described above, and can be implemented in various forms without departing from the scope of the present disclosure. For example, the present disclosure can also be implemented by the following aspects. In order to solve a part or all of technical problems according to the present disclosure, or to achieve a part or all of effects according to the present disclosure, technical characteristics in the above-described embodiments corresponding to technical characteristics in each of aspects to be described below can be replaced or combined appropriately. In addition, the technical characteristics can be deleted appropriately unless described as essential in the present description.

(1) According to an aspect of the present disclosure, there is provided an injection molding machine management system that includes an injection molding machine and manages one or a plurality of injection molding units that produces a molded article. The injection molding machine management system includes a display unit configured to display a display screen on which operation information on an operation status of the injection molding unit and at least one of container shortage information on a shortage of a container that accommodates the molded article and material shortage information on a shortage of a material for molding the molded article are displayed on an injection molding unit basis. The container shortage information is displayed on the display screen in association with the operation information when the container is insufficient in the injection molding unit, and the material shortage information is displayed on the display screen in association with the operation information when the material is insufficient in the injection molding unit.

According to such an aspect, a user can replenish the container or the material based on the container shortage information or the material shortage information while referring to the operation information displayed on the display screen. Therefore, it is more possible to prevent a delay in the production of the molded article caused by a state in which the container or the material is insufficient in the injection molding unit being unnoticed.

(2) In the above aspect, abnormality information on an abnormality of the injection molding unit may be displayed on the display screen on an injection molding unit basis, and the abnormality information may be displayed on the display screen in association with the operation information when the abnormality occurs in the injection molding unit. According to such an aspect, when the abnormality information is displayed on the display unit, a user can eliminate the abnormality based on the displayed abnormality information, and when the container shortage information or the material shortage information is displayed, the user can replenish the container or the material based on the displayed information. Therefore, it is more possible to quickly eliminate the abnormality, the shortage of the material, and the shortage of the container in the injection molding unit, and to prevent the delay in the production of the molded article.

(3) In the above aspect, when the shortage of the container and the abnormality occur in the injection molding unit, the container shortage information and the abnormality information may be displayed in different regions of the display screen, and when the shortage of the material and the abnormality occur in the injection molding unit, the material shortage information and the abnormality information may be displayed in different regions of the display screen. According to such an aspect, for example, compared to a case in which the container shortage information or the material shortage information and the abnormality information are alternately displayed in the same region of the display screen, it is possible to improve visibility of the container shortage information or the material shortage information and the abnormality information on the display screen. Therefore, it is more possible to prevent the delay in the production of the molded article.

(4) In the above aspect, the container shortage information may be displayed on the display screen when the number of the remaining container is equal to or less than a predetermined first amount, and the material shortage information may be displayed on the display screen when a remaining amount of the material is equal to or less than a predetermined second amount. According to such an aspect, the container shortage information or the material shortage information can be displayed on the display screen by simple control at a timing at which the remaining amount of the material or the number of the remaining containers becomes a desired amount.

(5) In the above aspect, the container shortage information may be displayed on the display screen before the production of the molded article is stopped due to the shortage of the container in the injection molding unit, and the material shortage information may be displayed on the display screen before the production is stopped due to the shortage of the material in the injection molding unit. According to such an aspect, compared to a case in which the container shortage information or the material shortage information is displayed only when the injection molding unit is stopped due to, for example, the container shortage or the material shortage, it is more possible to replenish the container and the material before the injection molding unit is stopped or at a timing earlier than the stop of the injection molding unit. Therefore, it is more possible to prevent the delay in the production of the molded article.

(6) In the above aspect, the container shortage information may be displayed on the display screen, and the container shortage information may be represented by at least one of the number of containers in which the molded article is accommodated and the number of containers in which the molded article is not accommodated. According to such an aspect, it is more possible to replenish the containers at a more appropriate timing.

What is claimed is:

1. An injection molding machine management system that includes an injection molding machine and manages one or a plurality of injection molding units each of which produces a molded article by molding a material and places in a container the molded article that has been produced, the injection molding machine management system comprising:
    a display unit configured to display a display screen on which operation information on an operation status of each of the one or plurality of the injection molding units and at least one of container shortage information indicating a shortage of a remaining empty container in which accommodates the molded article has not been placed, and material shortage information indicating a shortage of the material for molding required to mold the molded article are displayed on an injection molding unit basis, wherein
    the display unit is configured to display the container shortage information is displayed on the display screen in association with the operation information when the remaining empty container is insufficient in each of the one or plurality of the injection molding units and
    the display unit is configured to display the material shortage information is displayed on the display screen in association with the operation information when the material is insufficient in the each of the one or plurality of injection molding units.

2. The injection molding machine management system according to claim 1, wherein
    abnormality information on an abnormality of each of the one or plurality of the injection molding units is displayed on the display screen on an injection molding unit basis, and
    the abnormality information is displayed on the display screen in association with the operation information when the abnormality occurs in each of the one or plurality of the injection molding units.

3. The injection molding machine management system according to claim 2, wherein
    when the shortage of the remaining empty container and the abnormality occur in each of the one or plurality of the injection molding units, the container shortage information and the abnormality information are displayed in different regions of the display screen, and
    when the shortage of the material and the abnormality occur in each of the one or plurality of the injection molding units, the material shortage information and the abnormality information are displayed in different regions of the display screen.

4. The injection molding machine management system according to claim 1, wherein
    the container shortage information is displayed on the display screen when the number of remaining empty containers is equal to or less than a predetermined first amount, and
    the material shortage information is displayed on the display screen when a remaining amount of the material required to mold the molded article is equal to or less than a predetermined second amount.

5. The injection molding machine management system according to claim 1, wherein
    the container shortage information is displayed on the display screen before the production of the molded article is stopped due to the shortage of the remaining empty container in each of the one or plurality of the injection molding units, and
    the material shortage information is displayed on the display screen before the production is stopped due to the shortage of the material required to mold the molded article in each of the one or plurality of the injection molding units.

6. The injection molding machine management system according to claim 1, wherein
    the container shortage information is displayed on the display screen, and
    the container shortage information is represented by at least one of the number of containers in which the molded article is placed and the number of remaining empty containers in which the molded article is not placed.

* * * * *